April 2, 1935. A. F. CALLISON 1,996,673
LIFT TRUCK
Filed Aug. 10, 1934 2 Sheets-Sheet 1
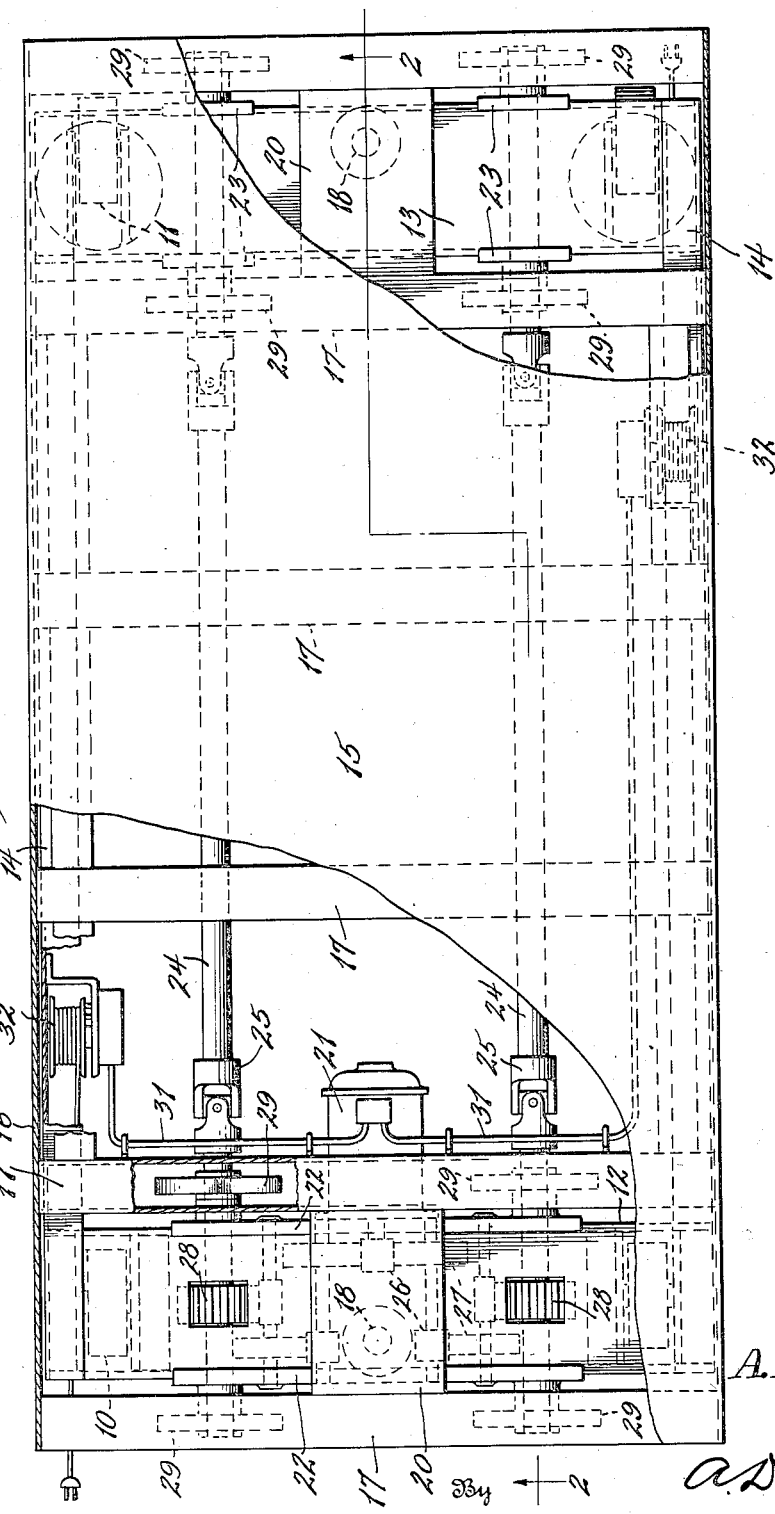
Inventor
A. F. Callison
By A. D. Adams
Attorney April 2, 1935.  A. F. CALLISON  1,996,673
LIFT TRUCK
Filed Aug. 10, 1934  2 Sheets-Sheet 2
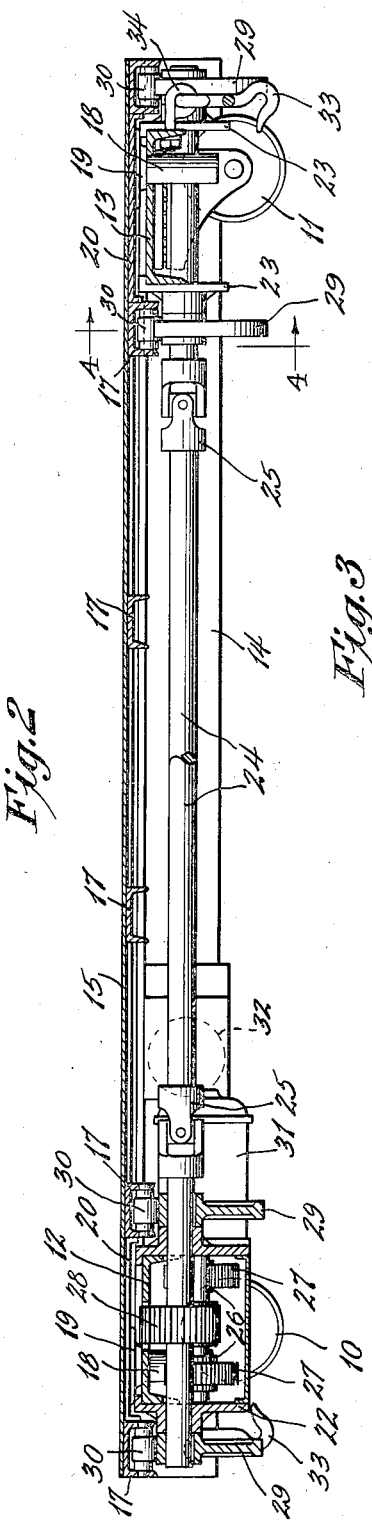
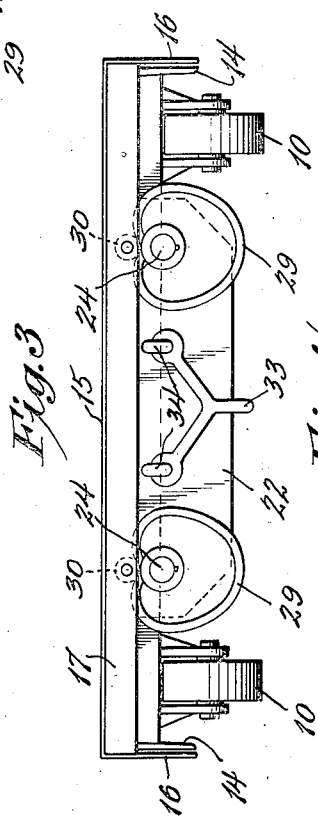
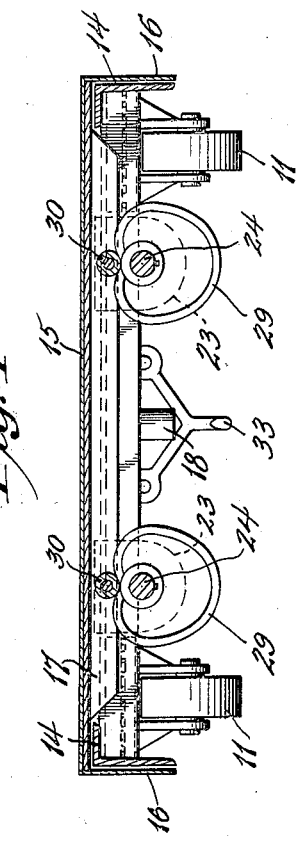
Inventor
A. F. Callison
By A. D. Adams
Attorney Patented Apr. 2, 1935

1,996,673

UNITED STATES PATENT OFFICE 1,996,673

LIFT TRUCK

Abner F. Callison, New York, N. Y.

Application August 10, 1934, Serial No. 739,346

4 Claims. (Cl. 254—2)

This invention relates to lift trucks and, among other objects, aims to provide an improved motor operated lift truck especially adapted to be used in transferring containers such as loaded skids and LCL freight containers from a truck or vehicle to a railway car, or from a railway car to a truck platform, or from a platform to a truck and vice versa. LCL containers are so designated because they carry less than a carload lot, the abbreviation meaning "Less Carload Lot". One of the objects is to provide a simplified and very durable light lift truck of the type adapted to be transported with a container or containers without requiring any extra room on the platform of a motor truck and railway car and further adapted to be connected to an ordinary electrical outlet so as to lift a container ready to be transferred from and to a truck, car or platform. Another aim is to provide a lift truck of the type adapted to be drawn by a winch and cable such as is provided on some of the conventional highway vehicles or trucks or by small tractor or commercial lift truck. Other aims and advantages of the invention will appear in the specification, when considered in connection with the accompanying drawings, wherein:

Fig. 1 is a top plan view partly broken away with parts shown in section, showing a lift truck embodying the invention;

Fig. 2 is a sectional view taken on line 2—2 of Fig. 1;

Fig. 3 is an end view; and

Fig. 4 is a sectional view taken on the line 4—4 of Fig. 2.

Referring particularly to the drawings, there is shown a special design of lift truck which is adapted to be rolled under a skid or a freight container such as the LCL containers commonly used by the railroads, its height and dimensions being such that it can be rolled freely between the short legs of such containers either from the sides or from the ends. In this example, the lift truck is shown as being made of structural steel or other metal, and is supported on a plurality of wheels 10 and 11, conveniently arranged in pairs, the wheels 10 being preferably, though not necessarily, carried by fixed brackets and the wheels 11 being swiveled, as clearly shown in Fig. 2. However, any suitable number and arrangement of wheels may be employed. The brackets are supported by transverse inverted channel beams 12 and 13, respectively, near the front and rear ends of the truck. These transverse channel beams are shown as being connected at their ends by a pair of structural angles 14 extending longitudinally of the truck and constituting the side members of the chassis frame. The flanges of the angle members may be bolted, welded or otherwise secured to the webs of the channel members and the construction is such that the whole frame may yield or rack slightly when the wheels of the truck roll over an uneven surface or floor.

The platform of the truck is shown as consisting of a sheet metal top 15 having integral side flanges 16 slightly spaced from the vertical flanges of the side frame members 14 and this platform is preferably supported on a series of transverse channels 17 having their flanges cut off at their ends where their webs overlap the horizontal flanges of the side frame members 14. The platform is shown as being guided to be lifted vertically by means of a pair of guide pins 18 each having a flange 19 at its upper end secured to the bottom face of a short flanged channel or plate 20 20 on the bottom of the platform at its opposite ends. These pins project through guide openings in the transverse channels 12 and 13. This arrangement prevents the platform from being twisted or canted with respect to the chassis frame so that it is free to be lifted by the mechanism which is about to be described.

The lifting means for the platform is here shown as being driven by an electric motor 21 which is supoprted by the chassis frame below the platform. Referring to Fig. 2, there is shown a pair of depending brackets 22 secured to the opposite or front and rear edges of the channel beam 12 and the housing of the motor is conveniently secured to the rear one of the brackets. Similar bearing brackets 23 are secured to the other transverse channel 13 and all of the brackets carry a pair of longitudinal shafts 24 extending from one end to the other of the frame. Each shaft has a pair of universal joints 25 to permit the chassis frame to be racked without bending them or binding them in their bearings. Both of these shafts are adapted to be driven by the motor through suitable reduction gearing numbered 26, 27 and 28, the arrangement being preferably such that the gear ratio is 1200:1 more or less. As a matter of fact, the motor may be equipped with any well known reduction gearing. The idea is to require only a small amount of power to lift a heavy load and to enable the motor to be controlled by a hand switch so that it can be stopped when the platform is lifted to the proper height without using an automatic switch for this purpose; although it is contemplated that an automatic stop switch may be used.

In this example, the two longitudinal shafts 24 are shown as having a plurality of heart-shaped lifting cams 29 cooperating with suitable anti-friction rollers 30 journalled in or carried by the supporting channels or joists 17 of the platform. Each shaft is shown as having four lifting cams and they are so arranged that the lifting load is well distributed. When the cams are in the position shown in Fig. 3, the platform is lowered and they are adapted to be turned through a half revolution to raise the platform to its limit. These cams rotate in one direction only; hence the motor does not have to be reversed.

To operate the lift truck, it is adapted to be pushed under a container between its legs and the motor connected to an electrical outlet which is available at nearly all loading stations. In this connection, it is contemplated that the motor may be either direct current or alternating current. In some cases, it will be desirable to install a direct current motor so that it may be driven by the storage battery of a motor truck or connected to any other source of direct current.

Referring to Fig. 1, the motor is shown as having a pair of electric cables 31 each connected to a take-up or self-winding reel 32 of conventional design, and one having a plug accessible from one end of the truck while the other is accessible from the other end of the truck. However, it is contemplated that one such electric cord may be employed for this purpose. After the truck is pushed either end first under the container to be lifted and conveyed to or from a motor vehicle or platform, the operator can easily reach one of the plugs and connect it to an electrical outlet. Then, he can snap on any convenient switch (not shown) and keep it on until the cams have been turned through a half revolution lifting the container clear of the floor and any ordinary obstacles.

Instead of depending upon the motor to propel the lift truck and adding considerably to the cost of it because of the extra power required, as well as the size of the motor, the lift truck is adapted to be transferred from place to place by means of well-known commercial lift trucks having their own power units, by ordinary small tractors or by winch operated cables with which some motor vehicles or trucks are equipped. For this purpose, the lift truck is designed to be operated from either end and to be moved or propelled in any space which is equal to the size of a skid or container. Also, it may be rolled under a freight container at either side or either end and removed from the other side or end. Incidentally, the base of a commercial LCL container is about seven feet by nine feet.

Referring to Figs. 2, 3 and 4, the truck has couplers at the ends in the form of pivoted hooks 33 each connected to a pair of eye-bolts 34 which are secured to the vertical flanges of the transverse channels or chassis frame members 12 and 13. These hooks are adapted to be connected to cables or to the couplers of ordinary tractors and the like and the lift trucks may be hitched behind a tractor to convey a number of containers or loaded skids from place to place. When the containers or skids are transferred to the desired place or places, one of the electric cables is plugged into a lamp socket or stationary outlet and the platform is lowered so that the lift truck may be pulled out and returned for another load or carried away in a motor vehicle or truck and container car to be used for further loading or unloading operations.

From the foregoing description, it will be seen that the lift truck is of very simple and rugged design and can be made at a fraction of the cost of the ordinary lift trucks having self-contained power units. In fact, it is sufficiently light to be pushed about by hand and can be used to transfer containers or loaded skids on inclined platforms without employing any propelling motive power other than a winch and cable. It is easy to operate to lift a container or loaded skid and can be carried as a part of a load on a carrier vehicle to be used in loading or unloading it. The field of usefulness is wide. For example, it may be employed to shift or move heavy articles, such as crated automobiles, heavy machinery to be moved or adjusted, and as a jack or lift. It is contemplated that its greatest field of use will lie in transferring LCL containers to and from railroad cars, automobile trucks and loading platforms. It will be understood that the platforms of such vehicles will be leveled with loading platforms or the platforms of railway cars, by the improved leveling device disclosed in my Patent No. 1,896,883, dated February 7, 1933. Thus, it will be understood that store-door delivery and other LCL transportation by railroad and automobile trucks will be greatly expedited and the cost of transfer reduced to a minimum.

Obviously, the present invention is not restricted to the particular embodiment thereof herein shown and described. Moreover, it is not indispensable that all the features of the invention be used conjointly, since they may be employed advantageously in various combinations and sub-combinations.

What is claimed is:

1. A lift truck for transferring freight containers, loaded skids and the like comprising, in combination, a chassis having pairs of wheels near its opposite ends; a flat lifting platform mounted on the chassis frame; a plurality of cams for lifting and lowering the platform cooperating guiding means on the bottom of the platform and the chassis frame to maintain the platform in proper engagement with the lifting cams and to guide the platform to lift vertically; a small motor supported by the chassis entirely below the platform so that the truck may be rolled, either end first, under a container or skid; reduction gearing connecting the motor to operate all of the lifting cams, all of the mechanism being below the platform and within its confines; and means accessible to both ends of the truck to connect the motor to a source of current.

2. A lift truck for transferring freight containers, loaded skids and the like comprising, in combination, a chassis having wheels near its opposite ends; a flat lifting platform mounted on the chassis frame; a pair of spaced parallel shafts journaled in the chassis frame, each having a pair of universal couplings; lifting cams keyed on said shafts to raise the platform; cooperating pins and sockets to guide the platform to be lifted vertically; a motor carried by the chassis frame entirely below the platform so that the truck may be rolled, either end first, under a container or skid; and reduction gearing connecting the motor to drive said shafts.

3. A lift truck for transferring freight containers, loaded skids and the like comprising, in combination, a chassis having a pair of wheels at each end; a flat lifting platform mounted on the chassis frame; a plurality of cams for lifting and lowering the platform; a small electric motor mounted below the platform so that the truck may be rolled, either end first, under a container or skid; reduction gearing connecting the motor to operate said lifting cams; a pair of electric cables connected to the motor extending to the opposite ends of the truck and adapted to be connected to a stationary source of current; and a pair of self-winding reels for the electric cables.

4. A lift truck of the character described comprising, in combination, a chassis frame having a pair of transverse structural channel members near its opposite ends and structural angles at its sides; a substantially rectangular lifting platform mounted on the chassis frame and having a plurality of transverse supporting members; wheels carried by said transverse structural channel members near the opposite ends of the truck; bearing brackets mounted on the transverse structural channel members; a pair of shafts each having universal joints therein journaled in said bearing brackets; an electric motor supported by one of said transverse structural channel members below said platform; reduction gearing connecting the motor to both of said shafts; a plurality of lifting cams carried by said shafts; and cam rollers mounted under said platform; electric cables connected to said motor and accessible from both ends of the truck adapted to be connected to a source of current.

ABNER F. CALLISON.